US012163541B2

(12) United States Patent
Kim

(10) Patent No.: US 12,163,541 B2
(45) Date of Patent: Dec. 10, 2024

(54) 3D HEAT EXCHANGER HEAT TRANSFER ENHANCEMENT DEVICE

(71) Applicant: Korea Aerospace Research Institute, Daejeon (KR)

(72) Inventor: Chun Taek Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 18/477,685

(22) Filed: Sep. 29, 2023

(65) Prior Publication Data

US 2024/0018981 A1 Jan. 18, 2024

Related U.S. Application Data

(62) Division of application No. 17/545,379, filed on Dec. 8, 2021, now abandoned.

(30) Foreign Application Priority Data

Mar. 30, 2021 (KR) ........................ 10-2021-0041207

(51) Int. Cl.

| | |
|---|---|
| ***F28F 13/00*** | (2006.01) |
| ***F15D 1/02*** | (2006.01) |
| ***F28F 13/06*** | (2006.01) |
| ***F28F 13/08*** | (2006.01) |

(52) U.S. Cl.

CPC .............. *F15D 1/025* (2013.01); *F28F 13/06* (2013.01); *F28F 13/08* (2013.01)

(58) Field of Classification Search

CPC .......... F28F 13/06; F28F 9/027; F28F 9/0273; F28F 9/0278; F28F 13/08

See application file for complete search history.

(56) References Cited

U.S. PATENT DOCUMENTS

| | | | |
|---|---|---|---|
| 3,780,772 | A | 12/1973 | Carnanhan et al. |
| 6,192,974 | B1 | 2/2001 | Boedecker |
| 2001/0017202 | A1 | 8/2001 | Mitsumoto et al. |
| 2005/0028874 | A1 | 2/2005 | Olbert et al. |

(Continued)

FOREIGN PATENT DOCUMENTS

| | | | |
|---|---|---|---|
| CN | 102649738 | A | 8/2012 |
| DE | 102008036609 | A1 | 4/2009 |

(Continued)

OTHER PUBLICATIONS

Office Action issued Oct. 6, 2022 in corresponding Korean Patent Application No. 10-2021-0041207.

*Primary Examiner* — Eric S Ruppert

(74) *Attorney, Agent, or Firm* — Blank Rome LLP

(57) ABSTRACT

Provided is a heat exchanger heat transfer enhancement device, and in particular, to a heat exchanger heat transfer enhancement device by allowing a fluid flowing into a heat exchanger to form a uniform flow field. A flow distribution device is disposed at an inlet of a pipe through which a fluid is introduced, and the flow distribution device includes a plurality of holes formed on a circumferential surface and an end portion to distribute the fluid to the center and the periphery. Also, a flange is formed at one end and coupled between the pipe and a diffusion portion. The distributed fluid passes through a heat exchanger, and here, one or more screens are disposed to make a flow field of the fluid more uniform.

6 Claims, 8 Drawing Sheets

(56) References Cited

U.S. PATENT DOCUMENTS

| | | | |
|---|---|---|---|
| 2018/0202727 | A1 | 7/2018 | Basini |
| 2022/0193650 | A1 | 6/2022 | Ganjvar |

FOREIGN PATENT DOCUMENTS

| | | | | | |
|---|---|---|---|---|---|
| GB | 191403331 | A | * | 2/1914 | ............... F28D 7/08 |
| JP | 45023748 | | * | 9/1970 | |
| KR | 10-2004-0075211 | A | | 8/2004 | |
| KR | 10-1483878 | B1 | | 1/2015 | |

* cited by examiner

3D HEAT EXCHANGER HEAT TRANSFER ENHANCEMENT DEVICE

CROSS-REFERENCE TO RELATED APPLICATIONS

This application is a divisional of U.S. patent application Ser. No. 17/545,379, filed Dec. 8, 2021, which claims priority under 35 U.S.C. § 119 to Korean Patent Application No. 10-2021-0041207, filed on Mar. 30, 2021, in the Korean Intellectual Property Office, the disclosures of which are incorporated herein by reference in their entirety.

TECHNICAL FIELD

The following disclosure relates to a heat exchanger heat transfer enhancement device, and in particular, to a device for enhancing heat exchanger heat transfer by allowing a fluid flowing into a heat exchanger to form a uniform flow field.

BACKGROUND

Heat exchangers are devices designed to exchange heat between two or more fluids. Heat exchangers aim to cool or heat a fluid through heat exchange. In general, a fluid pipe through which a cooling fluid flows is formed therein, and a plurality of heat exchange fins are arranged on an outer periphery of the fluid pipe to increase a heat dissipation area. As the fluid passes through the heat exchanger, heat exchange is performed.

The heated fluid is cooled using the heat exchanger. The heat exchanger has an area larger than a cross-sectional area of a pipe, and the pipe and the heat exchanger are connected through a diffuser. High heat exchange performance may be obtained only when a uniform flow passes through the heat exchanger, and thus, a method in which the diffuser is elongated in a fluid moving direction as shown in FIG. 1 has been used.

FIG. 1 is a cross-sectional view of a heat exchanger heat transfer enhancement device of a related art. Referring to FIG. 1, a fluid is introduced from an inlet of a pipe and is diffused over the entire surface of the heat exchanger by a diffuser disposed between the pipe and the heat exchanger. As the diffused fluid passes through an inside of the heat exchanger, heat exchange is performed with heat dissipation fins to cool the fluid.

Here, in order to eliminate separation of the flow and efficiently utilize the heat exchanger, an elongated diffuser having a distance d1 from the pipe to the heat exchanger is used to form a flow field close to a uniform flow field, but this takes up a lot of space in a heat exchanger facility.

SUMMARY

An exemplary embodiment of the present disclosure is directed to providing a device for enhancing heat transfer in which a device for distributing a flow is inserted at an inlet of a heat exchanger, a screen is installed at a rear end of the heat exchanger to maintain the flow supplied to the inlet of the heat exchanger uniformly, and a facility or the like is installed to be compact by reducing a distance between a pipe and the heat exchanger.

Another exemplary embodiment of the present disclosure is directed to providing a device for enhancing heat transfer capable of deriving an optimized shape of holes of a flow distribution device by adjusting the holes according to a size of a heat exchanger and a pipe.

Another exemplary embodiment of the present disclosure is directed to providing a device for enhancing heat transfer in which a flow distribution device has a flange shape and is easily installed and fastened between a pipe and a diffuser by a bolt.

Another exemplary embodiment of the present disclosure is directed to providing a device for enhancing heat transfer, capable of improving straightness of a flow and reducing loss of pressure by installing a partition in consideration of the fact that an inlet flow field of a pipe may not enter uniformly and swirl may occur if there are elements such as tees and elbows in an inlet pipe.

In one general aspect, a heat exchanger heat transfer enhancement device includes a flow distribution device disposed at an inlet of a pipe and having a plurality of holes through which a fluid is discharged; a heat exchanger through which the fluid introduced from the flow distribution device passes to be cooled; a diffusion portion having a cross-section increased from the inlet toward the heat exchanger; and a converging portion having a cross-section decreased from the heat exchanger toward an outlet.

The flow distribution device may have a cylindrical shape and include end portion holes formed at an end portion of the flow distribution device and allowing the discharged fluid to be directed toward a front surface of the heat exchange and circumferential holes formed at a circumferential portion of the flow distribution device and allowing the discharged fluid to be moved along the diffusion portion.

A size of the holes of the circumferential portion and a size of the holes of the end portion of the flow distribution device may be different.

The flow distribution device may have a dome shape and include linear holes formed at the center of the flow distribution device and in which the discharged fluid faces a front surface of the heat exchanger and diffusion holes formed at a dome-shaped circumference and in which the fluid is moved along the diffusion portion.

Sizes of the linear holes and the diffusion holes may be different.

The flow distribution device may include a flange bolted between the pipe through which the fluid is introduced and the diffusion portion.

One or more screens in which a plurality of holes are formed may be disposed in one of a front surface, a rear surface, and front and rear surfaces.

The holes of the screen may increase in size from a central portion to a peripheral portion.

The screen disposed on a front surface of the heat exchanger may be formed to be convex in an inflow direction of the screen.

The heat exchanger heat transfer enhancement device may include a partition disposed on an inner surface of the diffusion portion and disposed to be parallel to a flow direction of the fluid.

An internal space of the diffusion portion may be uniformly separated along a circumference of the flow distribution device by partitions.

The partitions may be spaced apart from the flow distribution device in a circumferential direction.

In another general aspect, a method for enhancing heat exchanger heat transfer using the heat exchanger heat transfer enhancement device includes: an inflow operation in which a fluid is introduced from a pipe, a first distribution operation in which the introduced fluid is distributed to a circumferential portion and an end portion by the plurality of holes of the flow distribution device, an entering operation in which the distributed fluid moves to a heat exchanger by a diffusion portion and a flow of a gas enters uniformly the entire front surface of the heat exchanger, and a cooling operation in which the fluid passing through the heat exchanger is cooled.

Also, a method for enhancing heat exchange heat transfer includes: an inflow operation in which a fluid is introduced from the pipe, a first distribution operation in which the introduced fluid is distributed to a straight hole and a diffusion hole by the flow distribution device, an entering operation in which the distributed fluid is diffused by the diffusion portion so that a flow of the fluid uniformly enters a front end of the heat exchanger, and a cooling operation in which the fluid is cooled by passing through the heat exchanger.

The method may further include an adjustment operation in which a flow field of the fluid introduced from the inlet is uniformly adjusted by installing a partition on an internal surface of the diffusion portion, after the first distribution operation.

The method may further include a second distribution operation in which a screen including a plurality of holes is disposed on a front surface of the heat exchanger and a central portion of the screen is formed to be convex so that a flow of the fluid is distributed to a peripheral portion, after the adjustment operation.

The method may further include a second distribution operation in which a screen including a plurality of holes is disposed on a front surface of the heat exchanger and a central portion of the screen is formed to be convex so that a flow of the fluid is distributed to a peripheral portion, after the first distribution operation.

Other features and aspects will be apparent from the following detailed description, the drawings, and the claims.

DETAILED DESCRIPTION OF EXEMPLARY EMBODIMENTS

Hereinafter, exemplary embodiments will be described in detail with reference to the accompanying drawings.

Figure 1:
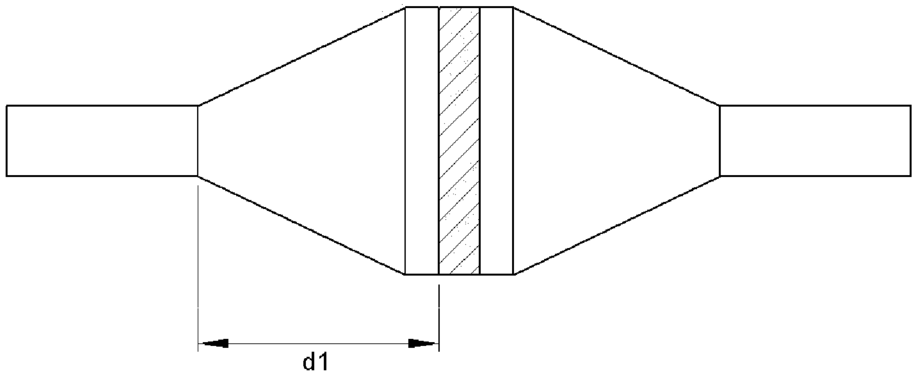
FIG. 1 is a device for transferring heat of a heat exchanger of the related art.

The present disclosure is an improvement of the heat transfer device of FIG. 1 in which a long diffuser is used from a pipe 100 to a heat exchanger in order to be close to a uniform flow field, which is disadvantageous in space. Thus, in the present disclosure, a flow distribution device for distributing a fluid in a circumferential direction and a direction toward an end is disposed at an inlet to reduce a distance between a pipe and a heat exchanger, thereby installing facilities or the like to be compact.

Hereinafter, a heat exchanger heat transfer enhancement device according to the present disclosure having the configuration as described above will be described in detail with reference to the accompanying drawings.

[1] Overall Configuration and Principle of Operation of the Present Disclosure

Figure 2:
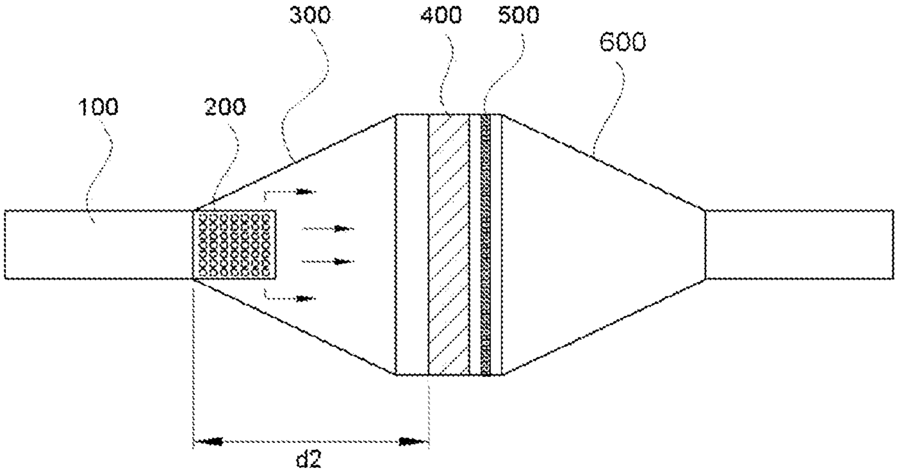
FIG. 2 is a view illustrating an overall configuration of the present disclosure.

First, FIG. 2 is an overall cross-sectional view of the present disclosure. Referring to FIG. 2, a fluid is introduced from an inlet 110 of the pipe 100 formed on the left and flows out through an outlet 120 of the pipe 100 formed on the right side. The fluid flowing in from the pipe 100 is distributed through a hole formed in the flow distribution device 200, and is diffused to the entire front surface of a heat exchanger 400 by a diffusion portion 300 disposed between the pipe 100 and the heat exchanger 400. The fluid passing through the heat exchanger 400 passes through a screen 500 disposed on a rear surface of the heat exchanger 400, is converged by a converting unit 600, and then flows out to an outlet 120.

Here, the flow distribution device 200 is formed in a hollow cylindrical shape. One end is connected to the pipe 100, the other end corresponds to an end portion 210 of the flow distribution device, and an end hole including a plurality of holes is formed. In the flow distribution device, a circumferential hole including a plurality of holes is formed in a circumferential portion 220. The fluid introduced by the formed hole is distributed in the circumferential direction and the direction of the end portion to proceed. The flow distribution device 200 has an effect of forming a uniform flow field in the heat exchanger 400 having a wider cross-section than the pipe 100. Holes formed in the circumferential portion 220 and the end portion 210 may have different sizes depending on the sizes of the heat exchanger 400 and the pipe 100.

The flow distribution device 200 is not limited to a cylindrical shape, but is formed in a dome shape to distribute the fluid. The dome-shaped flow distribution device is disposed at an inlet of the pipe and have a plurality of holes. There are provided a heat exchanger through which the fluid introduced from the flow distribution device passes through and is cooled, a diffusion portion having a cross-section wider from the inlet toward the heat exchanger, and a converging portion having a cross-section narrower from the heat exchanger toward an outlet of the pipe.

The hole of the flow distribution device includes a straight hole formed in the center of the dome shape for the discharged fluid to be direct to the front of the heat exchanger and a diffusion hole formed around the dome shape and through which the discharged fluid moves along the diffusion portion. Hole sizes of the straight portion and the diffusion portion may be different from each other.

The diffusion portion 300 is disposed between the pipe 100 and the heat exchanger 400 and serves to diffuse the introduced fluid throughout the heat exchanger 400. The diffusion portion 300 has a cross-section gradually increased from the pipe 100 to the heat exchanger 400, and a predetermined distance from a front surface of the heat exchanger 400 is formed in a straight line. The diffusion portion 300 serves as a guide for the fluid distributed from the flow distribution device 200 to proceed to the heat exchanger 400 and allows the fluid to uniformly flow over the entire front surface of the heat exchanger 400. Due to the flow distribution device 200, a length d2 of the diffusion portion 300 may be formed to be shorter than the length d1 of the diffuser of FIG. 1. As a result, the entire facility may be installed to be compact.

The screen 500 may include a plurality of holes or a dense mesh, and may be disposed on a rear surface of the heat exchanger 400 or within a straight range of the converging portion 600. By disposing the screen 500, the introduced fluid may be prevented from passing rapidly to the center so that the overall fluid flow is dispersed.

The converging portion 600 is disposed on the rear side of the heat exchanger 400. The converging portion 600 is formed in a straight line at a predetermined distance from the heat exchanger 400, and has a cross-section gradually decreased toward the outlet 120 of the pipe 100. In the drawing, the diffusion portion 300 and the converging portion 600 may be formed to have the same length or may be formed to have different lengths.

Figure 3:
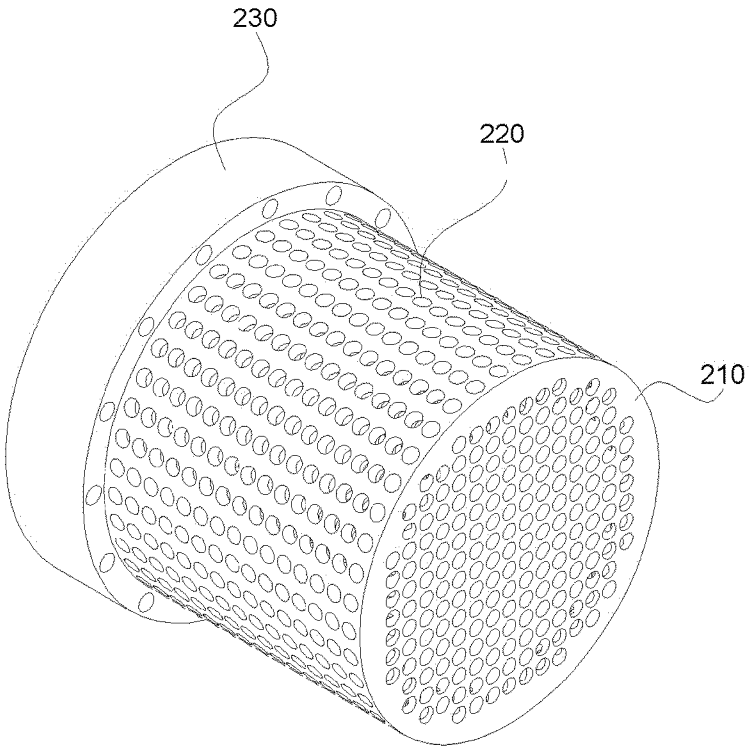
FIG. 3 is a perspective view of a flow distribution device of the present disclosure.

FIG. 3 is a perspective view of the flow distribution device 200 of the present disclosure. Referring to FIG. 3, the flow distribution device 200 has a cylindrical shape, and a plurality of holes are formed at the end portion 210 and the circumferential portion 220. The fluid introduced through the pipe is distributed through holes formed at the end portion 210 and the circumferential portion 220.

Here, the sizes and numbers of the holes of the end portion 210 and the holes of the circumferential portion 220 may be different by estimating a diameter of the pipe and a flow rate of the introduced fluid.

A flange 230 is formed at and connected to one end of the flow distribution device 200, and a hole in the flange 230 is formed in a longitudinal direction and bolted between the pipe and the diffusion portion.

Figure 4:
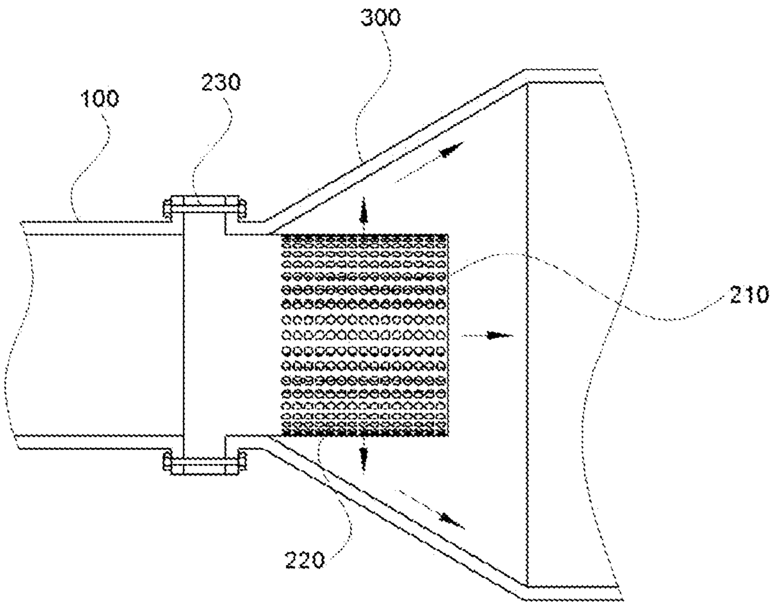
FIG. 4 is a cross-sectional view of a coupled flow distribution device of the present disclosure.

FIG. 4 is an enlarged view of the coupled flow distribution device 200 of the present disclosure. Referring to FIG. 4, the fluid is introduced from the pipe 100, and the fluid is distributed in the circumferential and straight directions by the flow distribution device 200. The fluid distributed in the circumferential direction is diffused to the periphery of the heat exchanger along an internal surface slope of the diffusion portion 300. A uniform flow field may be formed in the heat exchanger for the fluid to enter.

The flange 230 formed at one end of the flow distribution device 200 may be disposed between the pipe 100 and the diffusion portion 300 and may be bolted so as to be easily coupled and separated. An airtight member is additionally inserted between the pipe 100 and the flange 230 and between the flange 230 and the diffusion portion 300 to prevent fluid leakage.

Figure 5:
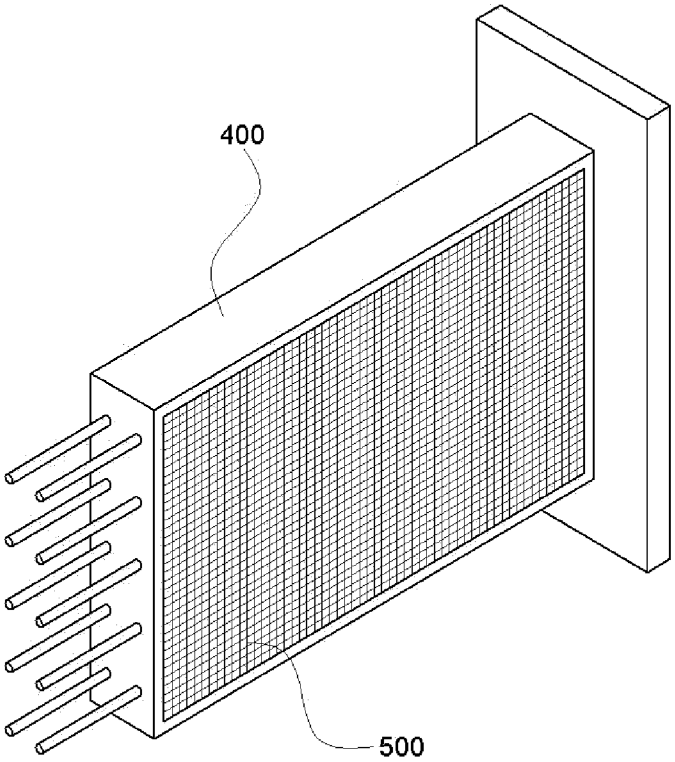
FIG. 5 is a perspective view of a screen of the present disclosure.

FIG. 5 is a perspective view of the heat exchanger 400 and the screen 500 of the present disclosure. Referring to FIG. 5, the fluid introduced through the pipe uniformly enters the heat exchanger 400 as a whole by the flow distribution device and the diffusion portion. A pipe through which a refrigerant flows is inserted into a side surface of the heat exchanger 400 to cool the fluid passing therein by a plurality of heat dissipation fins. A screen 500 is disposed on the rear side of the heat exchanger 400. The screen 500 may have a plurality of holes and may be formed in a dense mesh shape. The screen 500 has the effect of slowing the flow of the introduced fluid to have a sufficient diffusion time in the diffusion portion to form a uniform flow field and to increase efficiency by utilizing the overall area of the heat exchanger 400.

Figure 6:
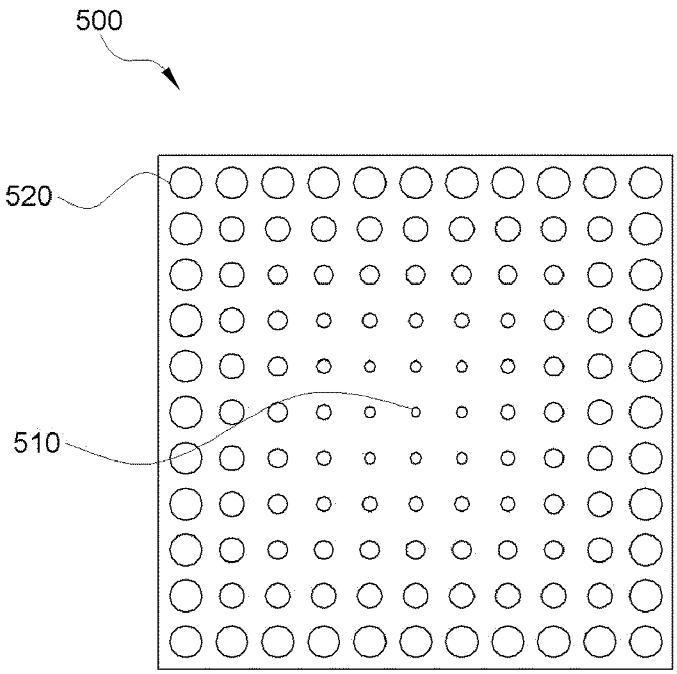
FIG. 6 is a view of a screen modification of the present disclosure.

FIG. 6 is a diagram illustrating a modification of a screen. Referring to FIG. 6, the fluid flowing into the inlet of the pipe is distributed to the circumferential portion and the end portion by the flow distribution device, and the distributed fluid enters the heat exchanger along the diffusion portion. Here, the fluid forms a uniform flow field in the diffusion portion and enters the entire front surface of the heat exchanger. In the screen 500 disposed on the rear surface of the heat exchanger, the hole sizes of the central portion 510 and the peripheral portion 520 may be different. By forming the hole sizes of the central portion 510 and the peripheral portion 520 to be different, the fluid passing through the center may be dispersed to the peripheral portion 520, thereby uniformly forming a flow field of the fluid passing through the heat exchanger. A difference in a flow rate between the fluid entering the heat exchanger 400 and the fluid passing through the heat exchanger 400 may be reduced, thereby increasing the efficiency of the heat exchanger 400.

FIG. 7 is a view of a change in screen arrangement of the present disclosure. Referring to FIG. 7, the fluid is introduced from the pipe 100, and the introduced fluid is distributed in the circumferential and straight directions through the flow distribution device 200. The distributed fluid enters with a uniform flow field formed over the entire front surface of the heat exchanger 400 by the diffusion portion 300, and the entered fluid is cooled by a refrigerant flowing through the heat exchanger 400 and a plurality of formed heat dissipation fins.

Figure 7A:
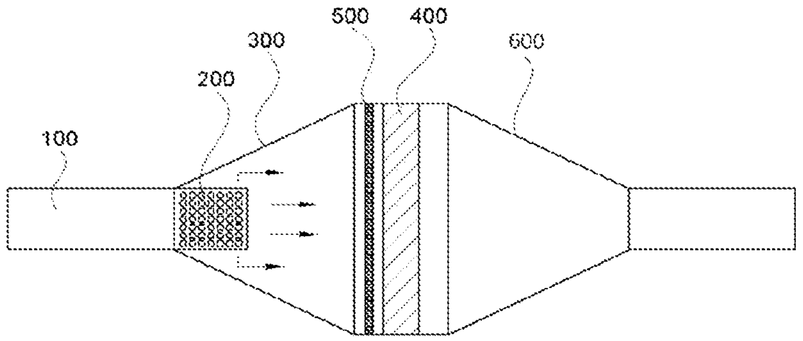
FIG. 7A, 7B are views of a screen arrangement modification of the present disclosure.

Referring to FIG. 7A, the screen 500 may be disposed in front of the heat exchanger 400. Since the screen 50 is disposed on the front side, a flow rate of the introduced fluid may be lowered and allow the fluid to pass through the whole uniformly, thereby efficiently utilizing the heat exchanger 400.

Figure 7B:
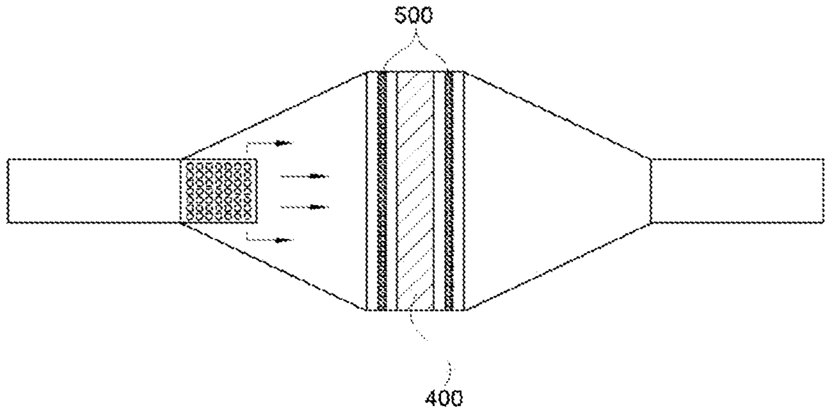

Referring to FIG. 7B, the screen 500 may be disposed on both sides of the front and rear surfaces of the heat exchanger 400. Since the screen 500 is disposed on both sides, the fluid introduced to the heat exchanger 400 from the diffusion portion 300 is diffused by the screens 500 disposed on the front side and uniformly passes through, and the fluid passing through the heat exchanger 400 forms a uniform flow field by the screen disposed on the rear side, thereby efficiently utilizing the heat exchanger 400.

Figure 8:
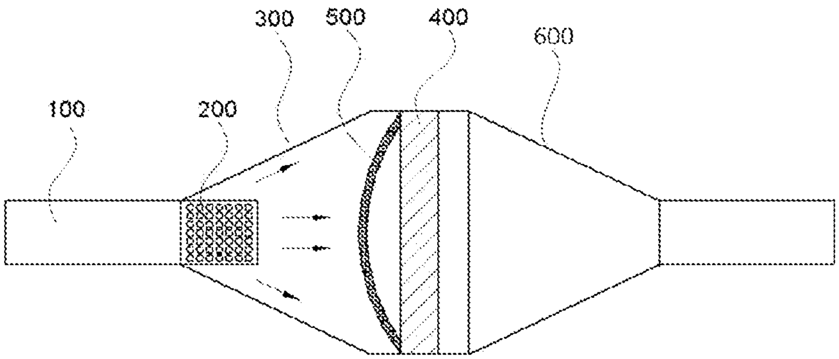
FIG. 8 is a view of a screen modification of the present disclosure.

FIG. 8 is a view showing a modified screen 500 of the present disclosure. Referring to FIG. 8, the fluid is introduced from the pipe 100, and the introduced fluid is distributed in the circumferential and straight directions through the flow distribution device 200. The distributed fluid enters with a uniform flow field formed over the entire front surface of the heat exchanger 400 by the diffusion portion 300, and the entered fluid is cooled by a refrigerant flowing through the heat exchanger 400 and a plurality of heat dissipation fins.

When the screen 500 is disposed in front of the heat exchanger 400, the center may be formed to be convex toward the inlet 110. Since the screen 500 is formed to be convex, the fluid coming toward the center may be diffused further along an outer surface of the screen 500, thereby forming a uniform flow field.

Figure 9:
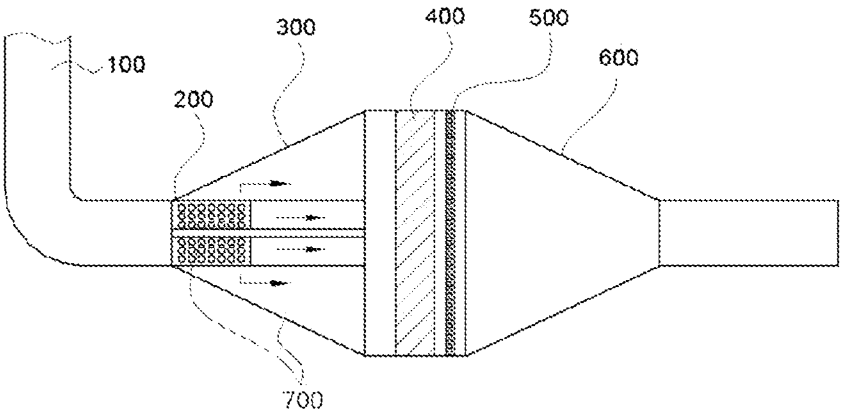
FIG. 9 is a third exemplary embodiment of the present disclosure.

FIG. 9 is a view in which a partition 700 of the present disclosure is disposed. Referring to FIG. 9, when elements such as a tee or an elbow are present in the inlet pipe 100, the inlet flow field of the pipe 100 may not enter uniformly and swirl may occur. In order to uniformly form the introduced fluid, the partition 700 is disposed on an inner wall of the diffusion portion 300 to be perpendicular to the heat exchanger 400. Thereby, the straightness of the flow may be improved and pressure loss may be reduced.

In this case, the partition 700 is disposed on an internal surface of the diffusion portion 300. A plurality of partitions 700 are uniformly disposed along the circumference of the flow distribution device 200 to separate an internal space. The partition 700 is formed on an inclined portion of the internal surface of the diffusion portion 300.

Although not shown in the drawings, a partition may also be disposed between the flow distribution device 200 and the heat exchanger 400.

Figure 10:
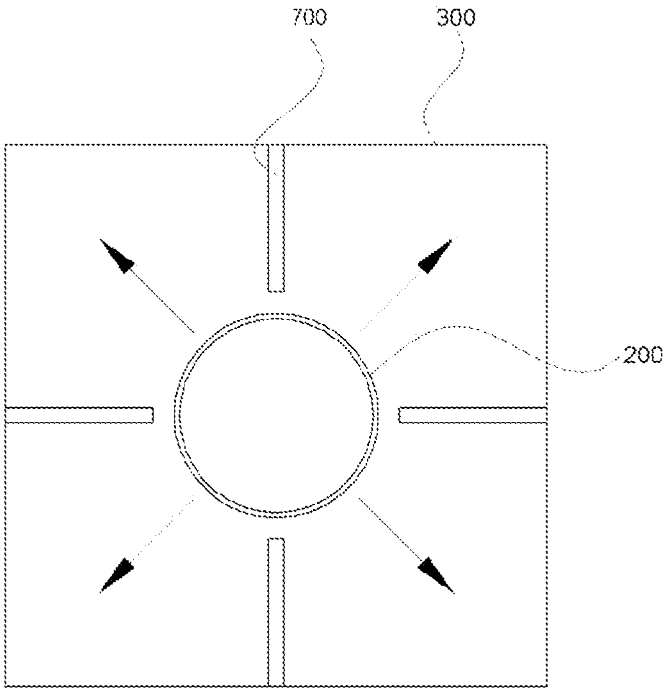
FIG. 10 is a cross-sectional view taken along line A-A' of the present disclosure.

FIG. 10 is a cross-sectional view taken along line A-A' of FIG. 9. Referring to FIG. 10, the pipe 100 is introduced and partitions 700 are arranged to be spaced apart from the flow distribution device 200 by a predetermined interval in a circumferential direction in the diffusion portion 300. A plurality of partitions 700 are arranged. A fluid is diffused to form a uniform flow field.

[2] Heat Exchanger Heat Transfer Method of the Present Disclosure

A method using a heat exchanger heat transfer enhancement device will be described. The method may include an inflow operation in which a fluid is introduced from a pipe, a first distribution operation in which the introduced fluid is distributed to a circumferential portion and an end portion by a flow distribution device, an entering operation in which the distributed fluid moves to a heat exchanger by a diffusion portion and a flow of a gas enters uniformly the entire front surface of the heat exchanger, and a cooling operation in which the fluid passing through the heat exchanger is cooled.

In the first distribution operation, the fluid is distributed to holes formed at the circumferential portion and the end portion of the flow distribution device. A uniform flow field is formed on the entire front surface of the heat exchanger, which is wider than a cross-section of the pipe, so that the flow distribution device may be disposed at an inlet to distribute the fluid on the whole.

In the entering operation, the fluid distributed by the flow distribution device is moved from the inlet to the heat exchanger by a diffusion portion having a gradually increased cross-section to the heat exchanger, and a uniform flow field is formed through diffusion.

In the cooling operation, the fluid in which a uniform flow field is formed through diffusion passes through the heat exchanger. The fluid is cooled by heat exchange by a refrigerant pipe of the heat exchanger and a heat dissipation plate formed on the refrigerant pipe. The cooled fluid flows out by a converging portion disposed between the heat exchanger and the pipe with the outlet.

A screen is disposed on a rear surface of the heat exchanger to create a bottleneck, making the flow more uniform.

Here, in the inflow operation, the pipe having the inlet may be formed in a straight line of a certain length so that the fluid may be uniformly introduced, but if the pipe has elements such as tees and elbows, the inlet flow field of the pipe does not enter uniformly and swell occurs.

The method may further include an adjustment operation in which the flow field of the fluid is uniformly adjusted by installing a partition on an internal surface of the diffusion portion, after the first distribution operation, so that the adjustment operation and the entering operation are performed simultaneously.

The method may further include a second distribution operation in which the flow is distributed to a peripheral portion as a screen is formed on a front surface of the heat exchanger and a central portion thereof is formed to be convex in an inflow direction, after the entering operation.

The present disclosure proposes a method for enhancing heat exchange heat transfer by applying a flow distribution device formed in a dome shape. The method includes an inflow operation in which a fluid is introduced from the pipe, a first distribution operation in which the introduced fluid is distributed to a straight hole and a diffusion hole by the flow distribution device, an entering operation in which the distributed fluid is diffused by the diffusion portion so that a flow of the fluid uniformly enters a front end of the heat exchanger, and a cooling operation in which the fluid is cooled by passing through the heat exchanger.

The detailed characteristics for each operation are the same as presented above.

According to the present disclosure, a flowing fluid is uniformly introduced into the heat exchanger and effectively cooled.

In addition, according to the present disclosure, the hole of the flow distribution device is adjusted according to the size of the heat exchanger and the pipe to derive an optimized shape.

In addition, according to the present disclosure, the flow distribution device has a flange and is inserted between the pipe and the diffuser so as to be easily mounted.

In addition, according to the present disclosure, if the inlet flow field of the pipe does not enter uniformly and swirl occurs, a partition is installed to improve the straightness of the flow and reduce the pressure loss.

DETAILED DESCRIPTION OF MAIN ELEMENTS

100: pipe
110: inlet
120: outlet
200: flow distribution device
210: end portion
220: circumferential portion
230: flange
300: diffusion portion
400: heat exchanger
500: screen
510: central portion
520: peripheral portion
600: converging portion
700: partition
D1: length of diffuser of related art
D2: length of diffusion portion of present disclosure

What is claimed is:

1. A heat exchanger, heat transfer enhancement device comprising:

a flow distribution device disposed in an inlet through which fluid is introduced, the flow distribution device defining a plurality of holes through which the fluid is discharged;

a heat exchanger through which the fluid introduced from the flow distribution device passes to be cooled;

a diffusion portion having a cross-section that increases from the inlet toward the heat exchanger;

a converging portion having a cross-section that decreases from the heat exchanger toward an outlet;

a screen defining multiple holes arranged adjacent to the heat exchanger; and a plurality of partitions disposed on an inner surface of the diffusion portion, wherein each of the plurality of partitions extends in a direction parallel to a flow direction of the fluid, and each of the plurality of partitions is radially spaced from the flow distribution device.

2. The heat exchanger, heat transfer enhancement device of claim 1, wherein the plurality of partitions uniformly separate an internal volume of the diffusion portion along a circumference of the diffusion portion.

3. The heat exchanger, heat transfer enhancement device of claim 1, wherein the screen is in front of the heat exchanger.

4. The heat exchanger, heat transfer enhancement device of claim 1, wherein the screen is in rear of the heat exchanger.

5. The heat exchanger, heat transfer enhancement device of claim 1, wherein:

the screen is a first screen in front of the heat exchanger, and the heat exchanger, heat transfer enhancement device further comprises a second screen in rear of the heat exchanger.

6. A method for enhancing heat exchange and heat transfer using the heat exchanger, heat transfer enhancement device of claim 1, the method comprising:

introducing fluid from a pipe;

adjusting a flow field of the fluid introduced from the pipe and through the inlet by installing the partitions of the diffusion portion, distributing the introduced fluid using the plurality of holes of the flow distribution device;

moving the distributed fluid to the heat exchanger using the diffusion portion such that a flow of a gas uniformly enters an entire front surface of the heat exchanger;

diffusing the flow of fluid entering the heat exchanger using the screen; and cooling the fluid passing through the heat exchanger.

* * * * *